US012793487B2

(12) United States Patent
Malthurkar

(10) Patent No.: US 12,793,487 B2
(45) Date of Patent: Nov. 10, 2026

(54) SYSTEM AND METHOD FOR DOOR LOCK MANAGEMENT

(71) Applicant: Honeywell International Inc., Charlotte, NC (US)

(72) Inventor: Ganesh Kumar Malthurkar, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 82 days.

(21) Appl. No.: 18/918,819

(22) Filed: Oct. 17, 2024

(65) Prior Publication Data

US 2025/0124754 A1 Apr. 17, 2025

Related U.S. Application Data

(60) Provisional application No. 63/590,931, filed on Oct. 17, 2023.

(51) Int. Cl.
*G07C 9/00* (2020.01)

(52) U.S. Cl.
CPC .................... *G07C 9/00571* (2013.01); *G07C 2009/00515* (2013.01)

(58) Field of Classification Search
CPC ...... G07C 2009/00515; G07C 9/00309; G07C 9/00571
See application file for complete search history.

(56) References Cited

U.S. PATENT DOCUMENTS

| | | | |
|---|---|---|---|
| 4,013,930 | A | 3/1977 | Geller |
| 4,528,558 | A | 7/1985 | Steers et al. |
| 4,689,610 | A | 8/1987 | Dietrich |
| 4,727,735 | A | 3/1988 | Haag et al. |
| 5,083,342 | A | 1/1992 | Klinefelter |
| 5,744,875 | A | 4/1998 | Kleefeldt et al. |
| 5,801,625 | A | 9/1998 | Wang |
| 7,129,597 | B2 | 10/2006 | Proefke et al. |
| 7,129,820 | B2 | 10/2006 | Noma et al. |
| 7,741,969 | B2 | 6/2010 | Linford |
| 8,180,327 | B2 | 5/2012 | Yang |
| 9,441,401 | B2 | 9/2016 | Nardelli et al. |
| 9,685,017 | B2 | 6/2017 | Johnson |
| 9,691,203 | B1 | 6/2017 | Shen |

(Continued)

*Primary Examiner* — Omer S Khan
(74) *Attorney, Agent, or Firm* — Seager, Tufte & Wickhem, LLP

(57) ABSTRACT

Method and/or systems for controlling transmission and reception of control signals associated with lock devices of a door lock system. The method comprises receiving, from a server, operational data corresponding to the door lock system. Further, the method comprises obtaining, by a master lock device, real-time information and real-time environmental condition information associated with the door lock system. The method also comprises determining, by the master lock device, a peak time duration and an off-peak time duration corresponding to the door lock system based on the received operational data and obtained real-time information. Moreover, the method comprises controlling, by the master lock device, the transmission and reception of the control signals associated with at least one slave lock device among the plurality of lock devices based on the determined peak time duration and the determined off-peak time duration.

16 Claims, 5 Drawing Sheets

(56) References Cited

U.S. PATENT DOCUMENTS

| | | | | |
|---|---|---|---|---|
| 9,697,658 | B1 | 7/2017 | Dumas et al. | |
| 9,697,661 | B1 | 7/2017 | Dumas et al. | |
| 9,697,662 | B2 | 7/2017 | Wang | |
| 9,721,413 | B2 | 8/2017 | Dumas et al. | |
| 9,761,073 | B2 | 9/2017 | Cheng et al. | |
| 9,852,561 | B2 | 12/2017 | Dumas et al. | |
| 9,936,522 | B2 | 4/2018 | Yang et al. | |
| 11,100,735 | B2 * | 8/2021 | Wang | G07C 9/00896 |
| 11,263,892 | B2 | 3/2022 | Laurans et al. | |
| 11,405,959 | B2 | 8/2022 | Back et al. | |
| 2010/0265035 | A1 | 10/2010 | Ziller | |
| 2011/0074543 | A1 * | 3/2011 | Kaczmarz | G07C 9/00571 340/5.73 |
| 2014/0054976 | A1 | 2/2014 | Ni et al. | |
| 2015/0161831 | A1 | 6/2015 | Shon et al. | |
| 2017/0032594 | A1 | 2/2017 | Chandler, Jr. | |
| 2018/0268630 | A1 | 9/2018 | Manoharan et al. | |
| 2020/0175637 | A1 * | 6/2020 | Li | G06Q 50/40 |
| 2023/0182685 | A1 | 6/2023 | Siswick et al. | |
| 2023/0243194 | A1 | 8/2023 | Matsui et al. | |
| 2024/0290151 | A1 * | 8/2024 | Yamaki | G07C 9/00309 |

* cited by examiner

SYSTEM AND METHOD FOR DOOR LOCK MANAGEMENT

CROSS REFERENCE TO RELATED APPLICATIONS

The present application claims the benefit of and priority to U.S. Provisional Application No. 63/590,931, filed Oct. 17, 2023, titled SYSTEM AND METHOD FOR DOOR LOCK MANAGEMENT, the disclosure of which is incorporated herein by reference.

TECHNICAL FIELD

The disclosure generally relates to field of security and access control systems, and more particularly relates to systems and methods for controlling transmission and reception of control signals associated with lock devices of a door lock system.

BACKGROUND

Smart door lock systems have gained significant popularity in recent years due to enhanced security features, personalized features for users, and integration with smart home ecosystems. A smart door lock system typically incorporates electronic components such as sensors, microcontrollers, wireless communication modules, motors, LED indicators, keypads, touch pads, and biometric authentication mechanisms. Further, a reliable power source is required for the electronic components of the smart door lock system to ensure the proper functioning and one or more operations of the smart door lock system.

A battery is commonly used as the power source to supply power to the electronic components of the smart door lock system. However, the battery has a limited energy capacity that may result in several challenges, such as, limited operational capacity, frequent charging, uncontrolled battery consumption, etc. Moreover, parameters associated with power consumption by the smart door lock system are considered as a core parameter for analysing performance of the smart door lock system. Specifically, lower the power consumption, longer the service life of the smart door lock system.

Traditionally, existing smart door lock systems continuously transmit and receive signals in order to collect data and deliver notifications to Building Management Systems (BMSs). However, for most of the users of the existing smart door lock systems, such continuous transmission and reception of the signals is not required in off-peak hours i.e., when the smart door lock systems are not in use for an extended period of time. The continuous transmission and reception of the signals leads to an increase in the battery usage, cost of effect, and energy consumption, and thus reduces the battery life.

Therefore, it would be advantageous to provide a solution that can overcome the above mentioned limitations and disadvantages associated with the existing smart door lock systems.

SUMMARY

This summary is provided to introduce a selection of concepts, in a simplified format, that are further described in the detailed description of the disclosure. This summary is neither intended to identify essential inventive concepts of the disclosure nor is it intended for determining the scope of the disclosure.

Disclosed herein is a method for controlling transmission and reception of one or more control signals associated with a plurality of lock devices of a door lock system. The method comprises receiving, from a server, operational data corresponding to the door lock system by a master lock device among the plurality of lock devices. The operational data includes at least one of historical data associated with a past usage of the door lock system or data indicative of a user preference associated with the door lock system. Further, the method comprises obtaining, by the master lock device, real-time information including at least one of location information associated with the door lock system and real-time environmental condition information associated with the location information of the door lock system. The method also comprises determining, by the master lock device, a peak time duration and an off-peak time duration corresponding to the door lock system based on the received operational data and obtained real-time information. Moreover, the method comprises controlling, by the master lock device, the transmission and reception of the one or more control signals associated with at least one slave lock device among the plurality of lock devices based on the determined peak time duration and the determined off-peak time duration.

In one or more embodiments, for receiving the operational data from the server, the method comprises transmitting, to the server by the master lock device, a request for the operational data corresponding to the door lock system. The method may further comprise receiving, by the master lock device, the operational data from the server in response to the transmitted request.

In one or more embodiments, the request indicates a requirement of the operational data of a specific time duration.

In one or more embodiments, for determining the peak time duration and the off-peak time duration corresponding to the door lock system, the method comprises analyzing the operational data and the real-time information using one or more Artificial Intelligence (AI) models. The method may also comprise determining a usage pattern of the door lock system based on a result of the analysis of the operational data and the real-time information. The method furthermore comprises determining the peak time duration and the off-peak time duration based on the determined usage pattern.

In one or more embodiments, for controlling the transmission and reception of the one or more control signals, the method comprises controlling at least one of a time and an intensity of transmission and reception of the one or more control signals by the at least one slave lock device during the determined off-peak time duration.

Also disclosed herein is a door lock system that comprises a server and a plurality of lock devices. The plurality of lock devices includes a master lock device and at least one slave lock device. The master lock device and the at least one slave lock device is communicably coupled to the server. The master lock device is configured to receive, from the server, operational data corresponding to the door lock system. The operational data includes at least historical data associated with a past usage of the door lock system or data indicative of a user preference associated with the door lock system. The master lock device is further configured to obtain real-time information including at least one of location information associated with the door lock system and real-time environmental condition information associated with the location information of the door lock system. The master lock device is further configured to determine a peak time duration and an off-peak time duration corresponding to the door lock system based on the received operational data and obtained real-time information. Additionally, the master lock device is configured to control transmission and reception of one or more control signals associated with the at least one slave lock device based on the determined peak time duration and the determined off-peak time duration.

In one or more embodiments, the master lock device is further configured to transmit, to the server, a request for the operational data corresponding to the door lock system. The master lock device may also be configured to receive, from the server, the operational data from the server in response to the transmitted request.

In one or more embodiments, to determine the peak time duration and the off-peak time duration corresponding to the door lock system, the master lock device is further configured to analyze the operational data and the real-time information using one or more Artificial Intelligence (AI) models. Also, the master lock device is configured to determine a usage pattern of the door lock system based on a result of the analysis. Additionally, the master lock device is configured to determine the peak time duration and the off-peak time duration based on the determined usage pattern.

In one or more embodiments, to control the transmission and reception of the one or more control signals, the master lock device is configured to control at least one of a time and an intensity of transmission and reception of the one or more control signals by the at least one slave lock device during the determined off-peak time duration.

To further clarify the advantages and features of the methods, systems, and apparatuses, a more particular description of the methods, systems, and apparatuses will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

Figure 1:
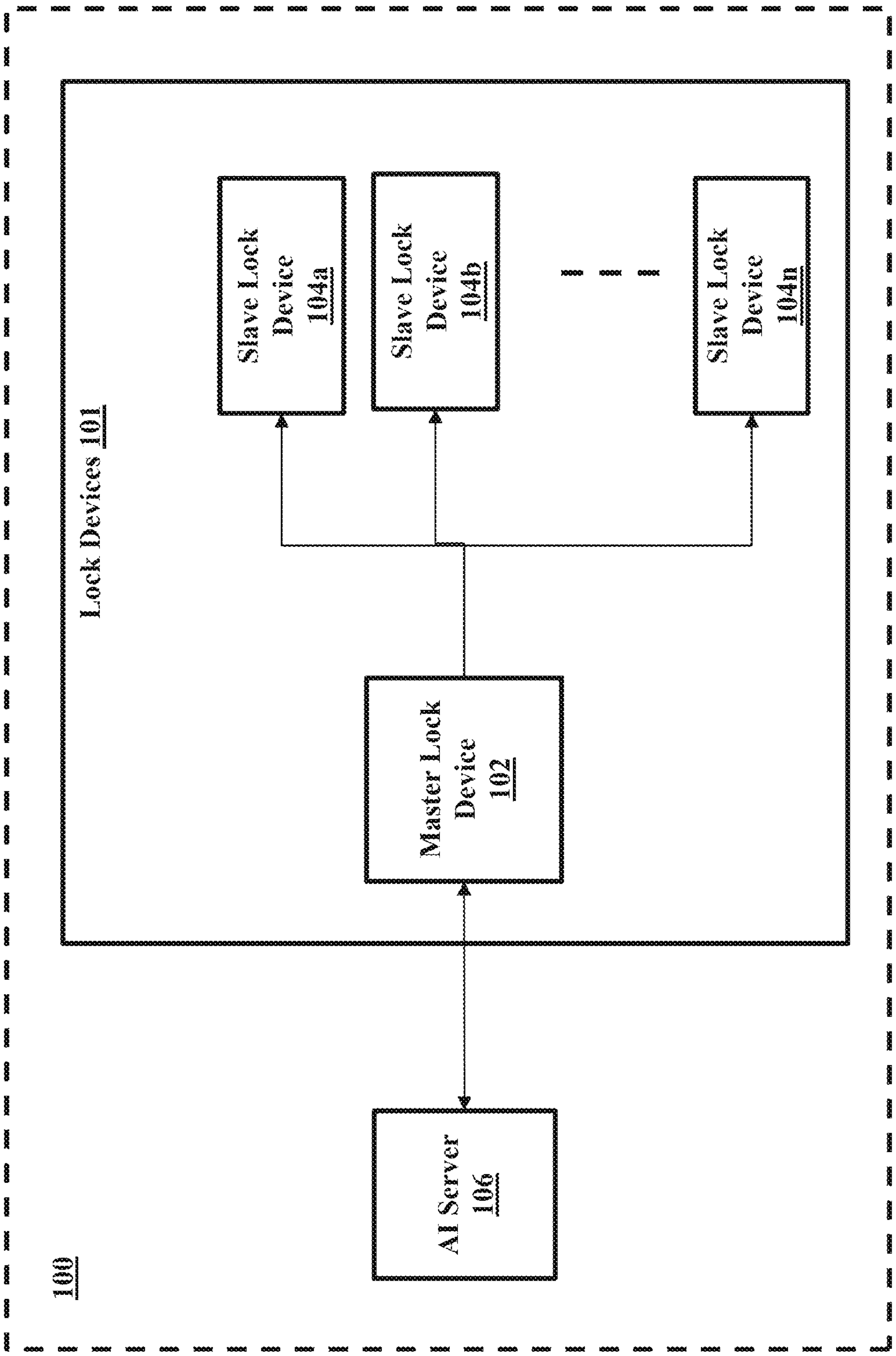
FIG. 1 illustrates a block diagram of a door lock management system.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", "includes", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the disclosure will be described below in detail with reference to the accompanying drawings.

FIG. 1 illustrates a block diagram of a door lock management system 100 (interchangeably referred to as "door lock system 100" or "system 100"). In one embodiment, the system 100 includes a plurality of lock devices 101 and a server 106. In a non-limiting example, the server 106 may correspond to an Artificial Intelligence (AI) based server.

The lock devices 101 may include a master door lock device 102 and a plurality of slave lock devices 104*a*-104*n* (interchangeably referred to as "the slave lock device 104"). The master lock device 102 and the slave lock device 104 may have a similar structure. Example of the master lock device 102 and/or the slave lock device 104 may correspond to a smart lock device that offers enhanced security, convenience, and intelligent functionality for locking and unlocking access points. The smart lock device integrates technologies to manual lock devices to provide a seamless and secure locking mechanism, which can be controlled remotely through a user-friendly interface. The smart lock devices comprise a physical locking mechanism and a connected electronic system that collaboratively enable versatile control and monitoring capabilities. The smart lock devices may also be equipped with wireless communication interfaces, enabling seamless remote access and management through a dedicated application on smartphones, tablets, computers, and the like. In some embodiments, the smart lock device may also comprise components and features such as, but not limited to, biometric authentication, wireless connectivity, security alerts, virtual keys, access logs, power management, and so forth.

In an exemplary embodiment, the master lock device 102 is configured to monitor and/or control the slave lock devices 104*a*-104*n* to manage power consumption of the slave lock devices 104*a*-104*n*. More particularly, the master lock device 102 may be configured to control transmission and reception of control signals associated with the slave lock devices 104*a*-104*n* of the system 100. Thus, the master lock device 102 reduces power consumption of the slave lock devices 104*a*-104*n* due to which overall performance of the system 100 is enhanced. A detailed description related to various operations/steps performed by the master lock device 102 will be provided below in the forthcoming paragraphs of the disclosure in reference to FIGS. 2-4.

The master lock device 102 may also be connected to the server 106 to perform one or more operations, such as, collection and analysis of operational data/real-time data corresponding to the door lock system 100. In some embodiments, the master lock device 102 may utilize an analysis approach that leverages diverse factors including historical usage patterns, data inputs, and real-time analysis for enhanced insights. In an embodiment, the server 106 may correspond to a computer system or a network of interconnected computers specifically designed to perform tasks related to AI and Machine Learning (ML). The server 106 may be equipped with powerful hardware components, such as high-performance Central Processing Units (CPUs) or Graphics Processing Units (GPUs), substantial memory, and efficient storage solutions to handle the computational demands of AI and ML operations.

In some embodiments, the server 106 may serve as the infrastructure for training and deploying various AI models that may be used by the master lock device 102 to control and/or regulate the operations of the slave lock devices 104*a*-104*n*. The server 106 may also be configured to execute resource-intensive tasks like training neural networks, deep learning models, and other complex operations that require massive amounts of data processing and mathematical computations. Additionally, the server 106 may be used for inferencing, which involves making predictions or decisions based on pre-trained models. Although, only a single server, i.e., the server 106 has been illustrated in FIG. 1, however, a person ordinary skilled in the art may understand that the example shown in FIG. 1 is merely exemplary in nature and does not limit the scope of the disclosure. Accordingly, more than one server may also be a part of the door lock system 100 in order to implement one or more functionalities disclosed herein.

In one or more embodiments, the server 106 may also incorporate specialized hardware accelerators, such as Tensor Processing Units (TPUs) or Field-Programmable Gate Arrays (FPGAs), which are optimized for specific AI and ML operations, further enhancing performance and energy efficiency.

In some embodiments, the server 106 may be integrated within the door lock system 100. In other embodiments, the server 106 may act as a standalone entity which is located remotely and may be connected to the lock devices 101 via a network (not shown). Further, the network may correspond to at least one of 2$^{nd}$ Generation 2G, 3$^{rd}$ Generation (3G), Long Term Evolution (LTE), Advanced LTE, 5th Generation (5G) communication networks. In some embodiments, the network may correspond to network components such as a base station. The term base station may generally refer to a fixed station that communicates with the user devices (for example, the lock devices 101) and/or other base stations. Specifically, the base station may exchange data and control information by communicating with the user devices and/or other base stations. The base station may also be referred to as a Node B, an evolved-Node B (eNB), a next generation Node B (gNB), a sector, a site, a Base Transceiver System (BTS), an Access Point (AP), a relay node, a Remote Radio Head (RRH), a Radio Unit (RU), a small cell, or the like. In the disclosure, a base station or a cell may be interpreted in a comprehensive sense to indicate some area or function covered by a Base Station Controller (BSC) in Code Division Multiple Access (CDMA), a Node-B in Wideband CDMA (WCDMA), an eNB in Long Term Evolution (LTE), a gNB or sector (site) in 5G, and the like, and may cover all the various coverage areas such as megacell, macro-cell, micro cell, picocell, femtocell, and relay node, and so forth.

Figure 2:
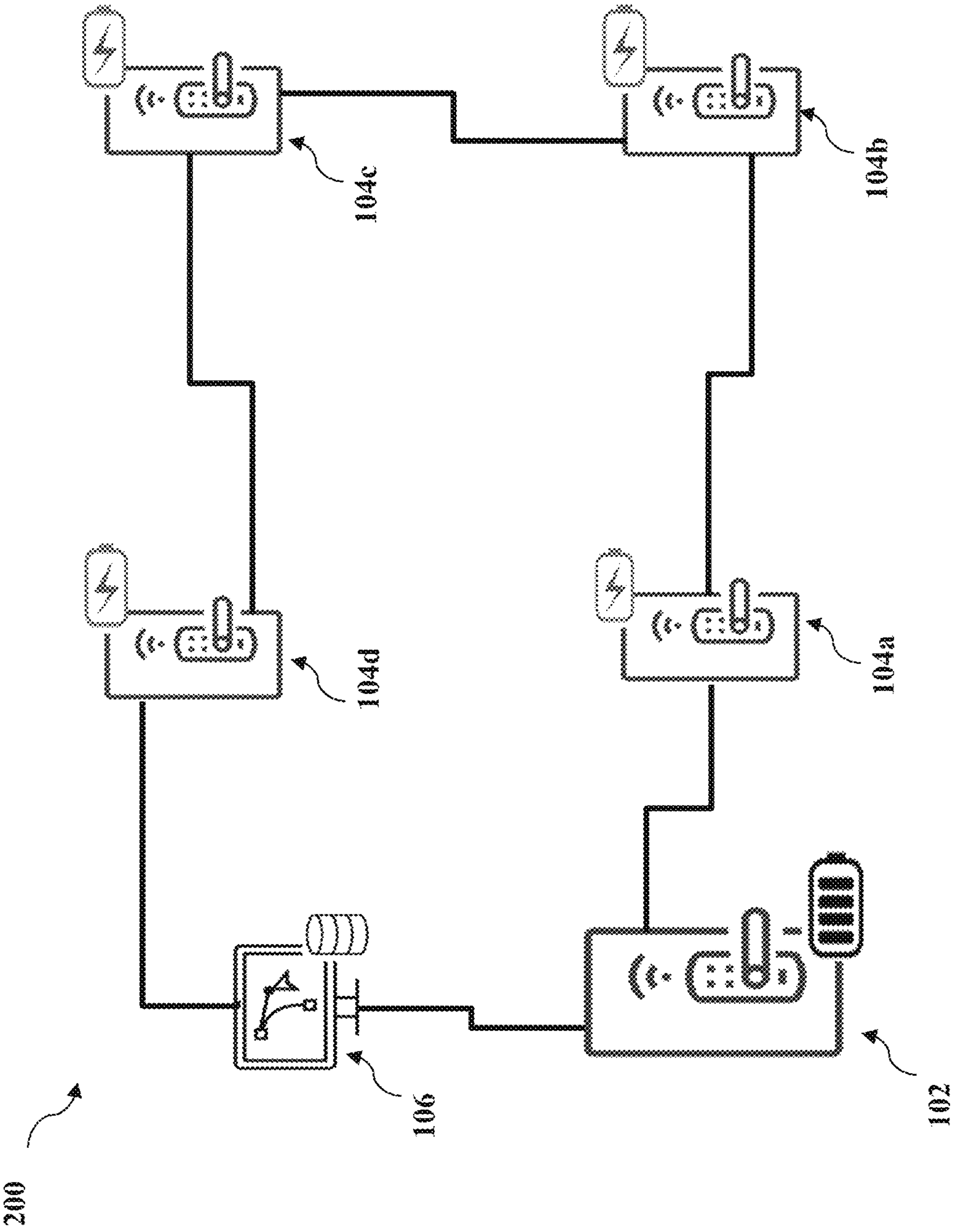
FIG. 2 illustrates an exemplary system environment of the door lock management system.

FIG. 2 illustrates an exemplary environment of a door lock management system 200 (interchangeably referred to as "system 200"). The system 200 may be similar to that of the system 100, as illustrated in FIG. 1. In an example embodiment, the system 200 may include the master lock device 102, four slave lock devices 104*a*-104*d*, and the server 106.

The master lock device 102 may be configured to control and coordinate activities of the slave lock devices 104*a*-104*d*. In an embodiment, the door lock system 200 may be implemented in a residential building where the master lock device 102 may be installed at a main entry door, and the slave lock devices 104*a*-104*d* may be installed at doors and/or windows of individual flats and/or rooms. In other scenarios, the door lock system 200 may be implemented in a commercial space including a plurality of offices, where the master lock device 102 may be installed at an access point within the commercial space, and the slave lock devices 104*a*-104*d* may be installed at individual entry doors of the plurality of offices. In such a scenario, the master lock device 102 may allow access to all the personnel working in all the offices within the commercial space. Further, the slave lock devices 104*a*-104*d* may allow access to employees of specific offices, respectively. While the above described scenarios are merely exemplary, the door lock system 200 may be implemented in various environmental contexts as well.

In some embodiments, the master lock device 102 and/or the server 106 may be directly connected to each of the slave lock devices 104*a*-104*d* to collect data/information required to coordinate with the slave lock devices 104*a*-104*d*. In alternative embodiments, the master lock device 102 may be connected to each of the slave lock devices 104*a*-104*d* via the server 106 and/or the other slave lock devices.

In an exemplary embodiment, each of the master lock device 102 and the slave lock devices 104*a*-104*d* may be configured to transmit and receive signals to collect data and deliver information/notification to a Building Management System (BMS) and/or user devices. The signals transmitted and/or received by the master lock device 102 and/or the slave lock devices 104*a*-104*d* may include, but are not limited to, access control signals, notification signals, parameter request signals, command signals, power signals, and so forth. The master lock device 102 and/or the slave lock devices 104*a*-104*d* may employ various techniques to perform such transmission and/or reception of signals. Such techniques may include, but not limited to, Bluetooth® communication, Wi-Fi® communication, Z-wave Communication®, Near-Field Communication (NFC)®, Radio Frequency Identification (RFID)® communication, and so forth.

In an exemplary embodiment, the server 106 may be configured to collect operational data corresponding to the door lock system 100. Specifically, the server 106 may be configured to collect information/data corresponding to each of the master lock device 102 and the slave lock devices 104*a*-104*d*. The operational data may correspond to, but not limited to, historical data associated with a past usage of the door lock system 100 or data indicative of a user preference associated with the door lock system 100. For instance, the historical data may include, lock/unlock events, access attempts, user activities, battery status, connection history, updates, alerts and notifications, lock status, geolocation data, prior user preferences, access logs, weather conditions, timestamps and durations, guest access, usage trends, device health, and so forth. User preferences may include, for example and without limitation, preferences for access using different communication or interface types, such as physical card access, NFC, and/or BLE, for example. User preferences may also be used to determine access log types and information contained therein, auto-lock duration (and/or time for remaining unlocked, conversely), user authentication content and type (PIN codes, fingerprint, facial recognition, voice recognition, etc.), whether and how the user prefers to integrate smart locks with home security system and/or camera or other sensor utilization, and user preferences for emergency or alert triggers, such as whether, how or when to respond to camera detection of motion or intruder, number of failed unlock or access attempts, and combinations thereof, for example and without limitation. The server 106 may be configured to utilize AI and/or ML techniques to process the collected operational data for use of the master lock device 102. In some embodiments, the server 106 may be configured to estimate peak and off-peak time duration for each of the lock devices (master lock device 102 and slave lock devices 104*a*-104*d*) based on the collected operational data using AI and/or ML technologies.

The master lock device 102 may be configured to receive the collected and/or processed operational data including estimation of the peak and off-peak time durations from the server 106. In alternative embodiment, the master lock device 102 may be configured to estimate the peak and off-peak time durations based on the operational data received from the server 106. In one or more embodiments, the master lock device 102 and/or the server 106 may estimate the peak and off-peak time durations based on parameters such as, but not limited to, time demand, day demand, season demand, user customized preferences, environmental parameters, proximity to high-traffic areas, and AI and ML parameters.

For instance, the master lock device 102 and/or the server 106 may analyze the historical data and/or usage patterns and identify that during morning and evening community hours, a frequency of access usage of the door lock is high, and there such time duration may be considered as peak time durations. Similarly, the master lock device 102 and/or the server 106 may analyze a range of lock/unlock activities during different days a week to identify which days correspond to peak time duration and which days correspond to off-peak time durations. For example, weekends (i.e., Saturday and Sunday) may correspond to off-peak time durations. Further, the master lock device 102 and/or the server 106 may consider some specific months and/or seasons of a year to estimate the peak and off-peak time durations. For example, during rainy days the lock/unlock activity may be less, and such seasons may be considered as off-peak time durations.

Moreover, a physical location i.e., whether the door lock is located indoor and/or outdoor, and/or the geographical location may help the master lock device 102 and/or the server 106 to determine whether conditions like extreme heat or cold, and based on said information, the peak and off-peak time durations are estimated. Similarly, the position of the door lock in relatively high-traffic areas may influence the usage pattern of the door lock. Thus, if the door lock is located at a high-traffic area or busy area the range of lock/unlock activities may be higher.

The master lock device 102 may be configured to delay transmission and/or reception of the signals at the slave lock devices 104*a*-104*d* during the off-peak time durations. In some embodiments, the master lock device 102 may be configured to control the transmission and reception of the signals at the slave lock devices 104*a*-104*d* based on a usage pattern which may be generated by the server 106. The usage pattern may indicate time-based control signals, demand-based control signals, override signals, and the like. In one embodiment, the server 106 may suggest the master lock device 102 in proximity of the slave lock devices 104*a*-104*d* to share updates and/or notifications associated with the slave lock devices 104*a*-104*d* to the designated user/device. Thus, the master lock device 102 may be configured to save battery of the slave lock devices 104*a*-104*d* during off-peak time durations. Thus, the life span of batteries of the slave lock devices 104*a*-104*d* can be increased and overall performance of the system 100 can be enhanced.

For example, during peak time durations, a first interval between communication attempts may be set for the master lock device 102 to initiate communication sessions with the slave lock devices 104*a*-104*d*, and, during off-peak time durations, a second interval which is longer than the first interval between communication attempts may be set. If scheduled communication is used, the schedule of communication may include relatively shorter time periods between scheduled communication attempts or sessions during peak time periods, and relatively longer time periods between scheduled communication attempts or session during off-peak time periods. Schedules or standardized communication session intervals/frequency can be set by the master lock device 102 with input from the server, and communicated to the slave lock devices 104*a*-104*d*, for example. For example, the master lock device 102 may control the transmission and reception of the one or more control signals so that communication of control signals from the master lock device to the slave lock device occurring more frequently during peak time durations than during off-peak time durations. This may be achieved by the master lock device communicating a schedule for communications to the slave lock device. In another example, this may be achieved by the master lock device communicating first parameters for communications to the slave lock device for use during the peak time durations, and second parameters for communications to the slave lock device during the off-peak time durations. The first and second parameters may set periods between communication attempts, or frequency of communication attempts (meaning, how often attempts occur, and not the frequency of oscillation defining such signals), for example.

Figure 3:
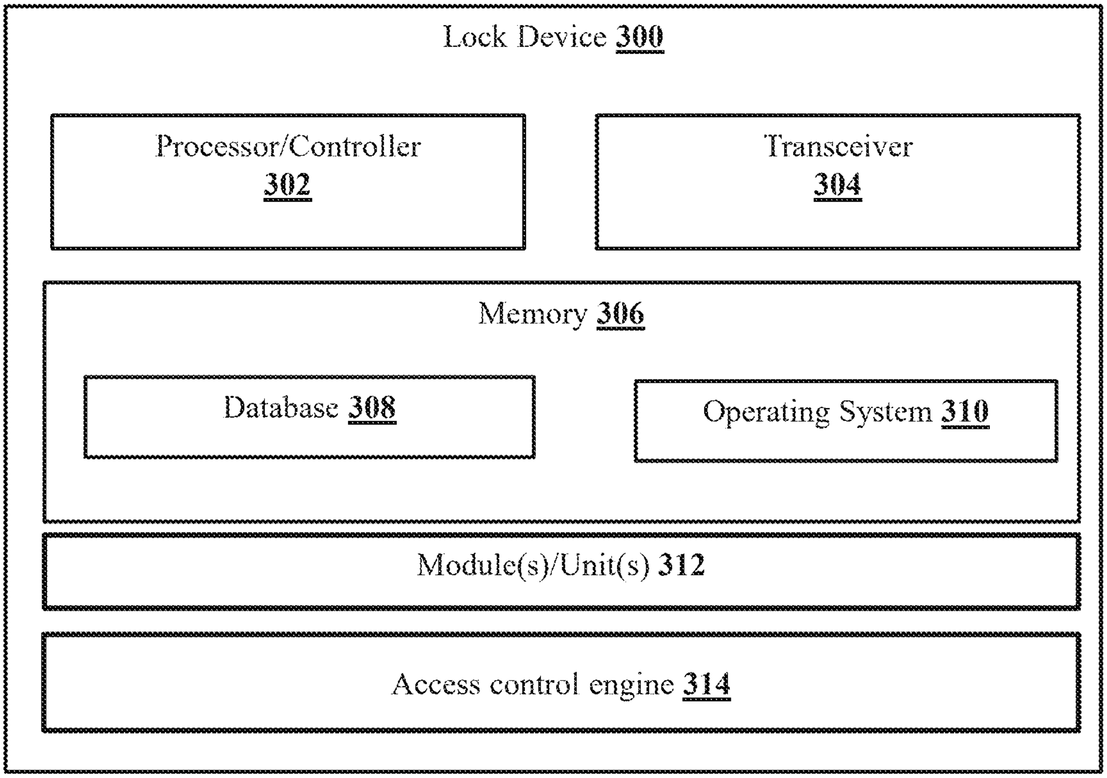
FIG. 3 illustrates a block diagram of a lock device corresponding to the door lock management system of FIG. 1.

FIG. 3 illustrates a block diagram of a lock device corresponding to the door lock management system of FIG. 1. The lock device 300 may correspond to any of the master lock device 102 and/or the slave lock devices 104*a*-104*n*. The lock device 300 may include one or more processors/controllers 302 (hereinafter referred to as "the processor 302"), a transceiver 304, a memory 306, one or more modules/units 312, and an access control engine 314.

The processor 302 may include specialized processing units such as, but not limited to, integrated system (bus) controllers, memory management control units, floating point units, digital signal processing units, etc. In one embodiment, the processor/controller 202 may include a central processing unit (CPU), a Graphics Processing Unit (GPU), or both. The processor 302 may be one or more general processors, Digital Signal Processors (DSPs), Application-Specific Integrated Circuits (ASIC), field-programmable gate arrays, servers, networks, digital circuits, analog circuits, combinations thereof, or other now known or later developed devices for analyzing and processing data. The processor 302 may execute a software program, such as code generated manually (i.e., programmed) to perform the desired operation.

In a case if the lock device 300 is the master lock device 102, the processor 302 may be configured to transmit a request, to the server 106, for the operational data corresponding to the door lock system 100. In some embodiments, the request may indicate a requirement of the operational data of a specific time duration. For instance, the master lock device 102 may only request operational data for the past 6 months. The processor 302 may be configured to receive the operational data from the server 106 in response to the transmitted request. The processor 302 may further be configured to analyze the operational data and the real-time information using one or more AI models to determine the usage pattern of the door lock system 100. The operational data and/or the real-time information may include, but not limited to, lock activities, user interaction with the lock devices, and environment status. The processor 302 and/or the one or more AI models may also be configured to pre-process the operational data and/or the real-time information in suitable format to perform the desired operation. For instance, processor 302 and/or the one or more AI models may be configured to perform feature extraction to determine relevant features such as, but not limited to, lock usage per day, week, or months, battery usage, lock frequency in peak and off-peak time duration. In an exemplary embodiment, the processor 302 may be configured to determine each of the peak time duration and the off-peak time duration based on the determined usage pattern. In some embodiments, the processor 302 and/or the one or more AI models may utilize Machine Learning (ML) techniques such as, but not limited to, time series analysis, regression analysis, and anomaly detection to determine the peak time duration and off-peak time duration.

The processor 302 may be further configured to control the transmission and reception of the one or more control signals associated with the slave lock devices 104*a*-104*n* based on the determined peak time duration and the determined off-peak time duration. In some embodiments, the processor 302 may be configured to control the transmission and reception of the one or more control signals associated with the slave lock devices 104*a*-104*n* based on parameters such as, battery consumption, user behavior, access logs, interactions, preference to usage, associated with the peak and off-peak time durations. In an embodiment, the processor 302 may use heatmaps to clearly visualize battery consumption during peak and off-peak time durations. In another embodiment, the processor 302 may perform predictive analytics to predict battery condition during the peak and off-peak time durations. Moreover, the processor 302 may be communicably coupled with the smart home system and/or BMS to fetch actionable and/or the real-time information. In some embodiments, the processor 302 may utilize a feedback loop AI to improve prediction and insights corresponding to the door lock system.

In an exemplary embodiment, the processor 302 may be configured to control parameters such as, but not limited to, a time and an intensity of the transmission and the reception of the control signals by the slave lock devices 104*a*-104*n* during the determined off-peak time duration. For example, during off-peak times, the processor 302 may be configured to reduce intensity of transmission and reception of the control signals during off-peak hours. In some examples, the time between transmission of control signals is extended, or the rate at which communication is attempted may be reduced, and/or the time period between transmission attempts (whether for control, linking, status or any other purpose) may be extended. As a result, the processor 302 may increase the time between transmission of control signals (and hence reception of the control signals) during off-peak hours. The result may be fewer and/or less frequent communication sessions, reducing power used during active communication time periods. Thus, the processor 302 may reduce power consumption of the slave lock devices 104*a*-104*n*.

In another embodiment, when the lock device 300 corresponds to a slave lock device among the slave lock devices 104*a*-104*n*, the processor 302 may be configured to control the transmission and reception of the control signals during off-peak hours based on instructions/signals from the master lock device 102.

The processor 302 may be disposed in communication with a network (not shown) via the transceiver 304. The transceiver 304 may act as a network interface for the processor 302. In some embodiments, the transceiver 304 may include inferences that may employ communication code-division multiple access (CDMA), high-speed packet access (HSPA+), global system for mobile communications (GSM), long-term evolution (LTE), WiMax, or the like, etc.

In particular, the transceiver 304 may enable the lock device 300 to communicate with other lock devices and/or the server 106. In an exemplary, the transceiver 304 may be capable of transmitting and receiving control signals to and from the other lock devices, user devices, and/or the server 106.

In some embodiments, the transceiver 304 can be implemented with a network interface to employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

The processor 302 may also be communicably coupled with the memory 306. The memory 306 may be configured to store data, and instructions executable by the processor 302. In one embodiment, the memory 306 may communicate via a bus within the lock device 300. The memory 306 may include, but not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like.

In one example, the memory 306 may include a cache or random-access memory for the processor 302. In alternative examples, the memory 306 is separate from the processor 302, such as a cache memory of a processor, the system memory, or other memory. The memory 306 may be an external storage device or database for storing data. The memory 306 may be operable to store instructions executable by the processor 302. The functions, acts or tasks illustrated in the figures or described may be performed by the programmed processor 302 for executing the instructions stored in the memory 306. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

In an exemplary embodiment, the memory 306 may be configured to store the operational data and/or real-time data that may be required by the processor 302 to estimate the peak and off-peak time durations. In some embodiments, the operational data and/or real-time data may be stored in a database 308 of the memory 306. Further, the memory 306 may include an Operating System (OS) 310 for performing one or more tasks of the lock device 300, as performed by a generic operating system.

In some embodiments, the modules/units 312 may be included within the memory 306. The modules/units 312 may include a set of instructions that may be executed to cause the processor 302 to perform any one or more of the methods/processes disclosed herein. In some embodiment, the modules/units 312 may be configured to perform one or more operations of the processor/controller 302. The one or more modules/units 312 may be configured to perform the steps of the disclosure using the data stored in the database 308 to estimate peak and off-peak time durations. In an embodiment, each of the one or more modules/units 312 may be a hardware unit which may be outside the memory 306.

The access control engine in a smart lock device serves as a central component responsible for managing and regulating access to the lock. Its primary function is to determine who is allowed to unlock or lock the smart lock and under what conditions.

Figure 4:
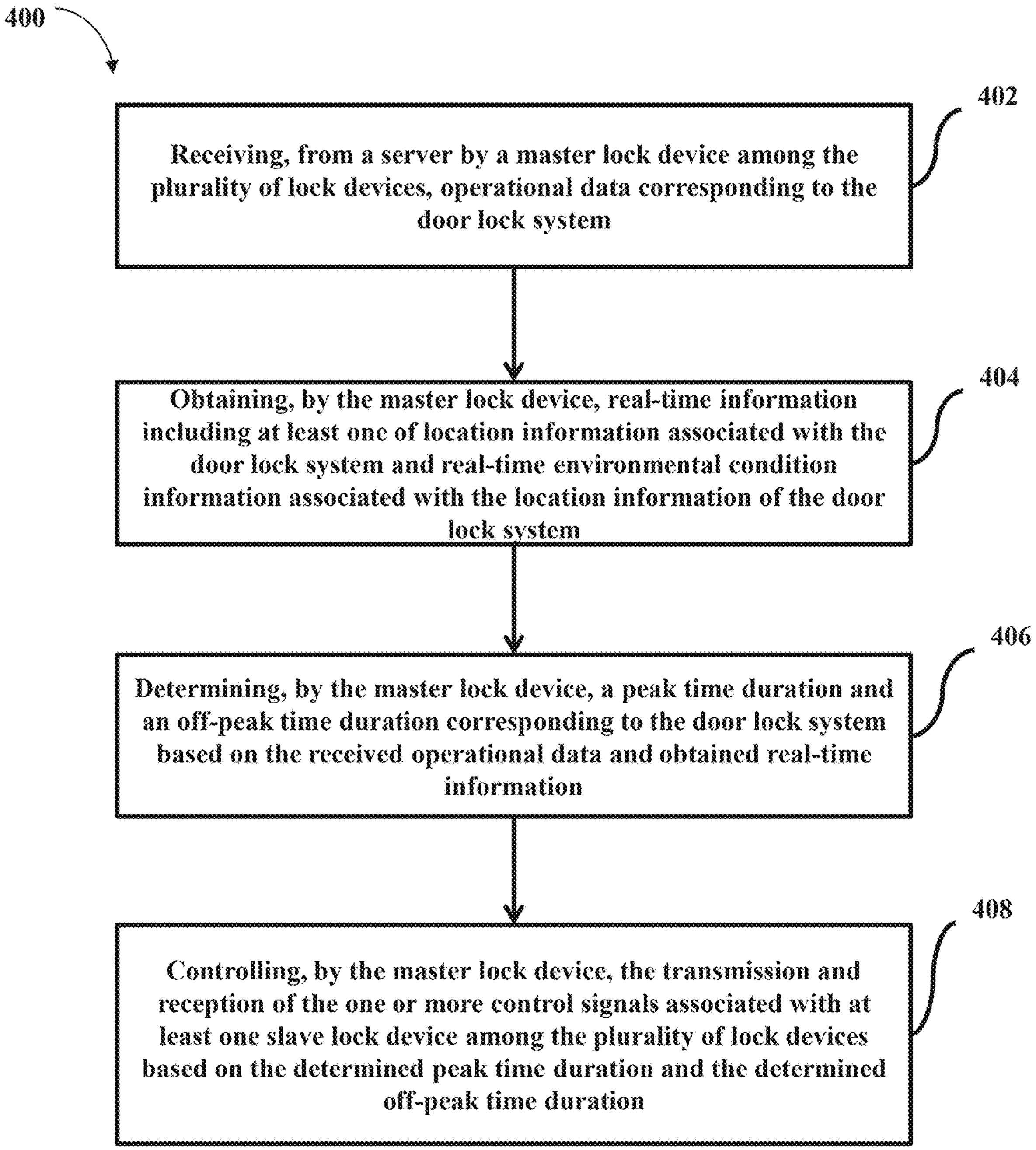
FIG. 4 illustrates a flow chart of a method of controlling transmission and reception of one or more control signals associated with a plurality of lock devices of a door lock system.

FIG. 4 illustrates a process flow depicting a method 400 for controlling transmission and reception of one or more control signals associated with a plurality of lock devices of a door lock system.

At step 402, the lock device 300 (for example, the master lock device 102) receives operational data corresponding to the door lock system 100 from the server 106. The operational data includes at least one of historical data associated with a past usage of the door lock system or data indicative of a user preference associated with the door lock system. Also, at step 402, the lock device 300 may transmit a request to the server 106 for the operational data corresponding to the door lock system 100. Moreover, in response to the transmitted request, the lock device 300 may receive the operational data from the server 106.

At step 404, the lock device 300 obtains real-time information including at least one of location information associated with the door lock system 100 and real-time environmental condition information associated with the location information of the door lock system 100.

At step 406, the lock device 300 determines the peak time duration and the off-peak time duration corresponding to the door lock system 100 based on the received operational data and the obtained real-time information. In an example embodiment, the lock device 300 may also analyze the operational data and the real-time information using the one or more AI models to determine the usage pattern of the door lock system 100. Accordingly, the lock device 300 determines the peak time duration and the off-peak time duration based on the determined usage pattern.

At step 408, the lock device 300 controls the transmission and reception of the one or more control signals associated with at least one slave lock device 104 based on the determined peak time duration and the determined off-peak time duration. In some embodiments, the lock device 300 may control at least one of the time and the intensity of transmission and reception of the one or more control signals by the at least one slave lock device **104*a*-104*n*** during the determined off-peak time duration. While the embodiments discussed above relate to door lock systems, it may be apparent to a person skilled in the art that the embodiments should not be restricted only to the door lock systems, without departing from the scope of the present disclosure.

While the above steps of FIG. 4 are shown and described in a particular sequence, the steps may occur in variations to the sequence in accordance with various embodiments of the disclosure. Further, the details related to various steps of FIG. 4, which are already covered in the description related to FIGS. 1-3 are not discussed again in detail here for the sake of brevity.

Figure 5:
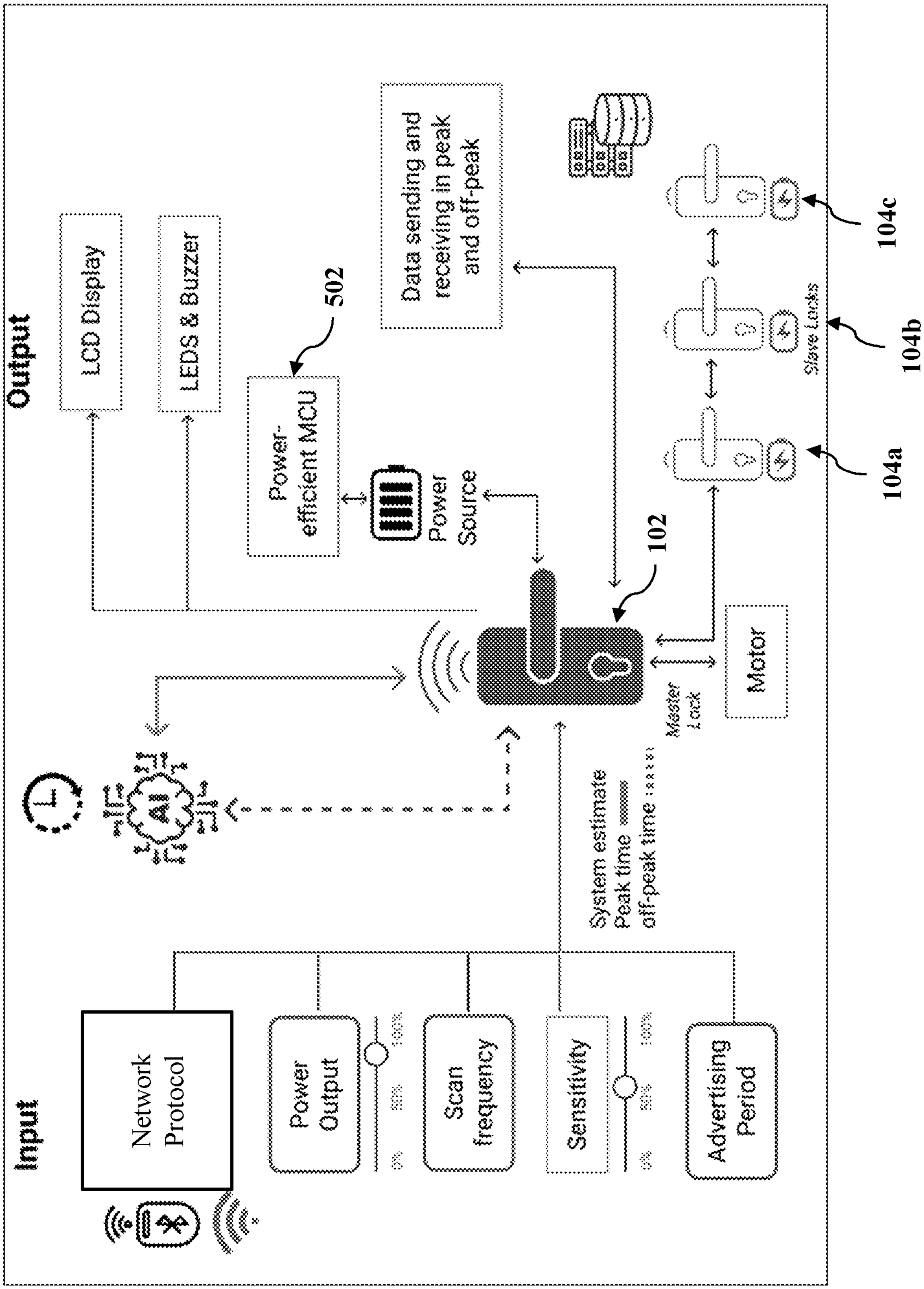
FIG. 5 illustrates a schematic architecture of a power efficient Master Control Unit (MCU) of the door lock system.

FIG. 5 illustrates a schematic architecture of a power efficient Master Control Unit (MCU) 502 of the door lock system. The door lock system may correspond to the door lock system 100 and/or the door lock system 200. In an embodiment, the power efficient MCU 502 may be integrated within the master lock device 102. In another embodiment, the power efficient MCU 502 may be remotely coupled with the master lock device 102. In an embodiment, the master lock device 102 in communication with the power efficient MCU 502 may receive and/or determine power efficient distribution of various components. For instance, the master lock device 102 may receive network protocol information that indicate which network protocol has been used by the master lock device 102 and/or the slave lock devices **104*a*-104*b*. As different network protocols such as, Bluetooth®, Wi-Fi®, offer varying levels of efficiency, security, and compatibility, the master lock device 102** may use the network protocol information determine the peak and off-peak time durations and associated operation of the door lock system.

The master lock device 102 may also utilize power output information to determine the peak and off-peak time durations. The power output information may indicate strength of the signals transmitted by the master lock device 102 and/or the slave lock devices **104*a*-104*c*. The power output information may assist the master lock device 102 to determine power consumption during signal transmission. For instance, higher strength may indicate higher power consumption. Further, the master lock device 102 may utilize scan frequency information to determine the peak and off-peak time durations. In particular, the scan frequency indicates how often a lock device and/or associated user device actively search for signals from other devices. The master lock device 102 may also utilize sensitivity information that indicate how well a receiver device detect weak signals. Moreover, the master lock device 102 may utilize advertising period information that indicates how often a device announces the presence of the device to nearby devices. Shorter periods are quicker but may lead to higher power usage. Thus, the master lock device in communication with the power efficient MCU 502** may utilize the above-mentioned features to determine the peak and off-peak duration and/or the associated parameters.

The power-efficient MCU 502 in communication with the master lock device 102 may control one or more devices such as, display devices (such as, Liquid Crystal Display (LCD), buzzer devices, light indicator devices (such as Light Emitting Diodes (LEDs), motor, and data transmission by the master lock device 102 and/or the slave lock devices 104*a*-104*c* during the peak and off-peak time durations to efficiently and efficiently manage power consumption by the door lock system.

Based on above, it is clear that the disclosure provides a door lock system that effectively and efficiently manages power consumption at each door lock device within the door lock system.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

I claim:

1. A method for controlling transmission and reception of one or more control signals associated with a plurality of lock devices of a door lock system, comprising:

receiving, from a server by a master lock device among the plurality of lock devices, operational data corresponding to the door lock system, wherein the operational data includes at least one of historical data associated with a past usage of the door lock system or data indicative of a user preference associated with the door lock system;

obtaining, by the master lock device, real-time information including at least one of location information associated with the door lock system and real-time environmental condition information associated with the location information of the door lock system;

determining, by the master lock device, a peak time duration and an off-peak time duration corresponding to the door lock system based on the received operational data and obtained real-time information, wherein the step of determining the peak time duration and the off-peak time duration for the door lock system includes:

analyzing the operational data and the real-time environmental information;

determining a usage pattern of the door lock system based on a result of the analysis; and determining the peak time duration and the off-peak time duration based on the determined usage pattern; and controlling, by the master lock device, the transmission and reception of the one or more control signals associated with at least one slave lock device among the plurality of lock devices based on the determined peak time duration and the determined off-peak time duration.

2. The method of claim 1, wherein, the step of receiving the operational data from the server comprises:

transmitting, to the server by the master lock device, a request for the operational data corresponding to the door lock system; and receiving, by the master lock device, the operational data from the server in response to the transmitted request.

3. The method of claim 2, wherein the request indicates a specific time duration for the operational data.

4. The method of claim 1, wherein the step of analyzing the operational data and the real-time environmental information includes using one or more Artificial Intelligence models.

5. The method of claim 1, wherein the step of analyzing the operational data and the real-time environmental information includes using one or more Machine Learning techniques.

6. The method of claim 1, wherein the step of controlling the transmission and reception of the one or more control signals includes controlling at least one of a time and an intensity of transmission and reception of the one or more control signals by the at least one slave lock device during the determined off-peak time duration.

7. The method of claim 1, wherein the step of controlling the transmission and reception of the one or more control signals includes communication of control signals from the master lock device to the slave lock device occurring more frequently during peak time durations than during off-peak time durations.

8. The method of claim 7, wherein the master lock device communicates a schedule for communications to the slave lock device.

9. The method of claim 7, wherein the master lock device communicates first parameters for communications to the slave lock device for use during the peak time durations, and second parameters for communications to the slave lock device during the off-peak time durations.

10. A door lock system, comprising:

a server; and a plurality of lock devices including a master lock device and at least one slave lock device, wherein the master lock device and the at least one slave lock device is communicably coupled to the server, the master lock device is configured to:

receive, from the server, operational data corresponding to the door lock system, wherein the operational data includes at least one of historical data associated with a past usage of the door lock system or data indicative of a user preference associated with the door lock system;

obtain real-time information including at least one of location information associated with the door lock system and real-time environmental condition information associated with the location information of the door lock system;

determine a peak time duration and an off-peak time duration corresponding to the door lock system based on the received operational data and obtained real-time information, wherein to determine the peak time duration and the off-peak time duration corresponding to the door lock system, the master lock device is configured to:

analyze the operational data and the real-time information using one or more Artificial Intelligence (AI) models;

determine a usage pattern of the door lock system based on a result of the analysis; and determine the peak time duration and the off-peak time duration based on the determined usage pattern; and control transmission and reception of one or more control signals associated with the at least one slave lock device based on the determined peak time duration and the determined off-peak time duration.

11. The system of claim 10, wherein, to receive the operational data from the server, the master lock device is configured to:

transmit, to the server, a request for the operational data corresponding to the door lock system; and receive, from the server, the operational data from the server in response to the transmitted request.

12. The method of claim 10, wherein the request indicates a requirement of the operational data of a specific time duration.

13. The system claim 10, wherein to control the transmission and reception of the one or more control signals, the master lock device is configured to:

control at least one of a time and an intensity of transmission and reception of the one or more control signals by the at least one slave lock device during the determined off-peak time duration.

14. The system of claim 10, wherein the master lock device is configured to control the transmission and reception of the one or more control signals by communicating control signals to cause communication between the master lock device and the at least one slave lock device to occur more frequently during peak time durations than during off-peak time durations.

15. The system of claim 14, wherein the master lock device is configured to communicate a schedule for communications to the slave lock device to thereby cause communication between the master lock device and the at least one slave lock device to occur more frequently during peak time durations than during off-peak time durations.

16. The system of claim 14, where in the master lock device is configured to communicate first parameters for communications to the slave lock device for use during the peak time durations, and second parameters for communications to the slave lock device during the off-peak time durations, to thereby cause communication between the master lock device and the at least one slave lock device to occur more frequently during peak time durations than during off-peak time durations.

* * * * *